May 8, 1934.  H. GORA  1,957,882

ROTARY CUTTER

Filed Oct. 21, 1932

INVENTOR
Henry Gora
BY
Ritter Mechlin & O'Neill
ATTORNEY

Patented May 8, 1934

1,957,882

UNITED STATES PATENT OFFICE 1,957,882

ROTARY CUTTER

Henry Gora, Bridgeport, Conn., assignor to Jenkins Bros., New York, N. Y., a corporation of New Jersey Application October 21, 1932, Serial No. 638,966

2 Claims. (Cl. 164—70)

The invention relates to certain improvements in rotary cutters and more particularly to cutters of the type employed in machines for cutting rubber rings, as exemplified in my prior Patent No. 1,864,903, dated June 28, 1932, in which two cutters mounted on opposite sides of a rotating mandrel, operating in parallel planes are offset a distance equal to the thickness of one annulus, so that, when the cutters are simultaneously advanced toward the mandrel, they will cut two annuli from a tube carried by the mandrel, the present invention providing means for accurately adjusting the cutters relatively to each other to insure the severance of rings of uniform thickness from the tube.

The invention is illustrated in the accompanying drawing, in which:—

Figure 1:
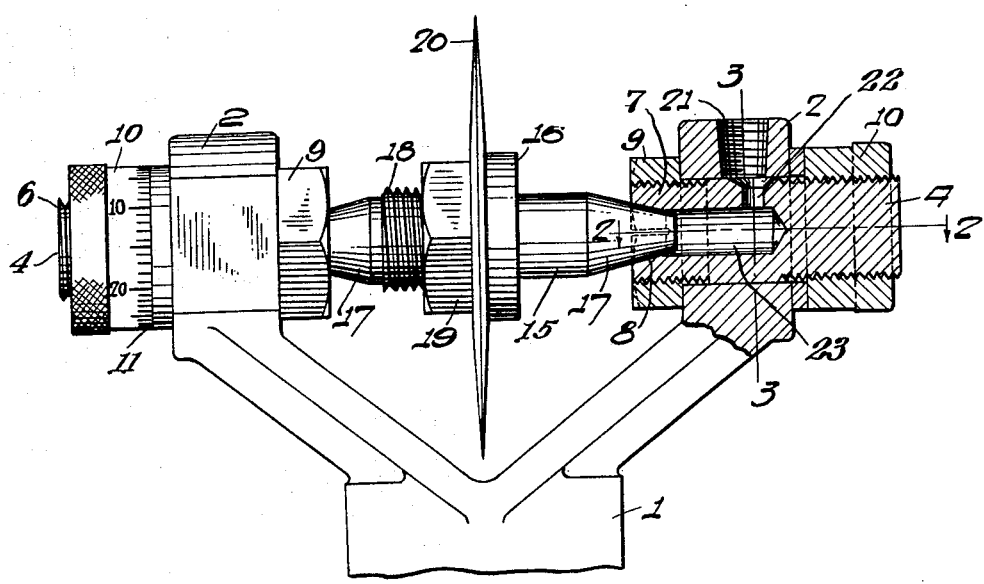
Fig. 1 is a fragmentary front elevation, partly in section, of a cutter and its mounting.

Referring to the drawing, 1 indicates the support for the cutter, which support is provided with laterally spaced arms 2, 2 having aligning openings therein. It will be understood that this particular support is merely exemplary and may take any other appropriate form, as, for example, the slide with upstanding arms or pedestals by means of which the cutter having a sliding movement is supported, as shown in the patent aforesaid.

Figure 3:
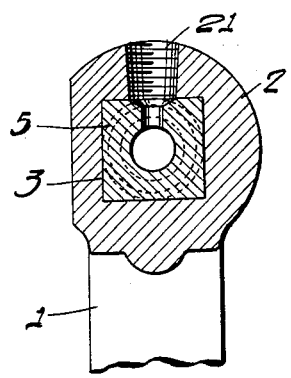
Fig. 3 is a section on line 3—3 of Fig. 1.
Figure 2:
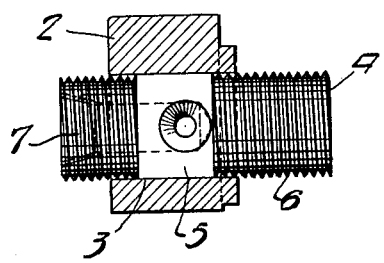
Fig. 2 is a section on line 2—2 of Fig. 1.

Slidably mounted in squared aligning openings 3 in the arms 2, 2 of the support are bearing pins 4, 4, which are prevented from rotation in the supporting arms by the squared mid sections 5 thereof, as more particularly illustrated in Fig. 3. The end portions of each bearing pin 4 are provided with relatively fine screw threads 6 and 7, the threaded end 7 being engaged by a lock nut 9 adapted to bear against the adjacent face of the arm 2 and the screw threads 6 being engaged by nut 10 provided with a knurled rim to facilitate adjustment thereof and having a peripheral scale 11 about its inner edge serving to indicate relatively fine adjustments of the nut 10 and, therefore, the coordinate adjustments of the corresponding bearing pin 4. Obviously, if desired, the arrangement of the set nuts may be reversed, that is to say, the nut bearing the scale may be applied to the inner end of the pin 4 and lock nut 9 to the outer end of said pin.

The inner end of each pin 4 is provided with a tapered or cone bearing 8 beyond which the pin is counterbored to provide an oil chamber 23, which communicates by way of duct 22 with a tapped opening 21 in the top of the arm 2, to which may be applied an oil cup or a plug, the counterbore 23 constituting a reservoir to retain lubricating oil or grease.

Supported in the tapered bores 8 of the bearing pins 4 are coordinately tapered or coned ends 17, 17 of a pintle 15 to which is fixed the annular cutter disk or knife 20, the latter being secured in position on the pintle intermediate the ends thereof by means of a shoulder 16 and a set nut 19 engaging screw threads 18 formed on the pintle.

In machines of the character illustrated in the patent aforesaid, employed for cutting rings or annuli from tubes of rubber or the like, it is highly essential that the thickness of the rings, measured axially, be uniform and, to effect this result, it is quite necessary that the rotary cutters be capable of very fine adjustment, which may be effected by operating the two micrometer nuts 10, 10 to adjust the bearing pins 4 and thereby move the pintle 15 and the cutter carried thereby to the necessary extent.

What I claim is:

1. The combination with a rotary cutter including a pintle having journals on its ends, a knife secured to the pintle intermediate the ends thereof, and a support having spaced arms by which the pintle is carried; of aligned bearing pins mounted for longitudinal sliding movement only in said arms and engaged by said journals, said bearing pins having screw threaded end sections, set nuts on the inner and outer ends of each bearing pin adapted to abut the inner and outer faces of the corresponding arms.

2. The combination with a rotary cutter including a pintle having journals on its ends, a knife secured to the pintle intermediate the ends thereof, and a support having spaced arms by which the pintle is carried; of bearing pins slidably mounted in aligned openings in said arms and engaged by the journals of said pintle, squared connections between the pins and arms to prevent rotation of the pins, said bearing pins having screw threaded end sections, set nuts on the inner and outer ends of each bearing pin adapted to abut the inner and outer faces of the corresponding arms, one of said set nuts on each pin having a peripheral scale thereon.

HENRY GORA.